L. N. SPENCER.
STEERING APPARATUS FOR TRAILERS.
APPLICATION FILED OCT. 28, 1916.

1,245,054.

Patented Oct. 30, 1917.
2 SHEETS—SHEET 1.

INVENTOR
Lawrence N. Spencer
BY Rozemond A. Parker ATTORNEY

L. N. SPENCER.
STEERING APPARATUS FOR TRAILERS.
APPLICATION FILED OCT. 28, 1916.

1,245,054.

Patented Oct. 30, 1917.
2 SHEETS—SHEET 2.

INVENTOR
Lawrence N. Spencer
BY Raizemound A. Parker ATTORNEY

UNITED STATES PATENT OFFICE.

LAWRENCE N. SPENCER, OF MILFORD, MICHIGAN, ASSIGNOR OF ONE-HALF TO GEORGE A. GITTINS, OF MILFORD, MICHIGAN.

STEERING APPARATUS FOR TRAILERS.

1,245,054.

Specification of Letters Patent.

Patented Oct. 30, 1917.

Application filed October 28, 1916. Serial No. 128,147.

*To all whom it may concern:*

Be it known that I, LAWRENCE N. SPENCER, a citizen of the United States, residing at Milford, county of Oakland, State of Michigan, have invented a certain new and useful Improvement in Steering Apparatus for Trailers, and declare the following to be a full, clear, and exact description of the same, such as will enable others skilled in the art to which it pertains to make and use the same, reference being had to the accompanying drawings, which form a part of this specification.

This invention relates to a steering apparatus for trailers adapted to be operated from the driver's seat of the vehicle that is drawing the trailer. It has the important dual function of being capable of making the trailer wheels practically track with the wheels of the preceding vehicle when the trailer is being drawn forward, and also of being capable of making the trailer wheels take a path with which the pushing vehicle wheels track when the trailer is being backed. These important functions are accomplished by the apparatus herein below more particularly described.

In the drawings,—

To the rear axle of the motor car is bolted a truss bar $a$. The draw pole $b$ of the trailer has a universal connection $c$ with this truss bar $a$. The rear end of the draw pole $b$ is rigidly bolted to the front axle $d$ of the trailer. This front axle in effect is precisely like the front axle of an automobile, being provided with the usual bifurcated ends $e$, forming the steering knuckles in connection with the knuckle on each of the steering arms $f$. These steering arms $f$ are connected by the usual steering link $g$ and one of the arms $f$ is provided with a drag link $h$.

Figures 1, 2:
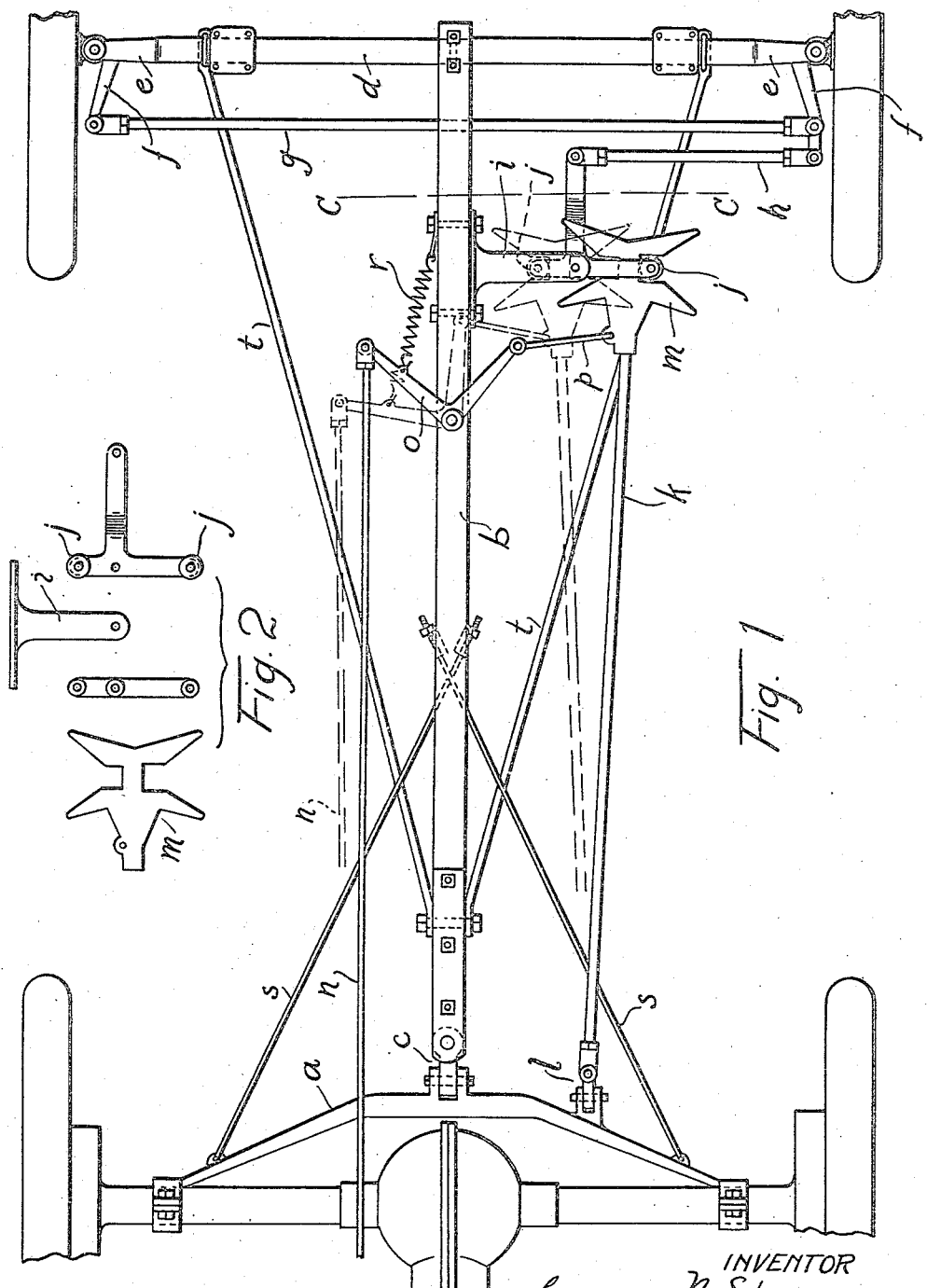
Figure 1 is a plan view of the apparatus and part of the motor vehicle and the trailer.
Fig. 2 is a view of the disassembled elements which immediately serve to change the direction of pull upon the steering arms of the trailer.
Figure 3:
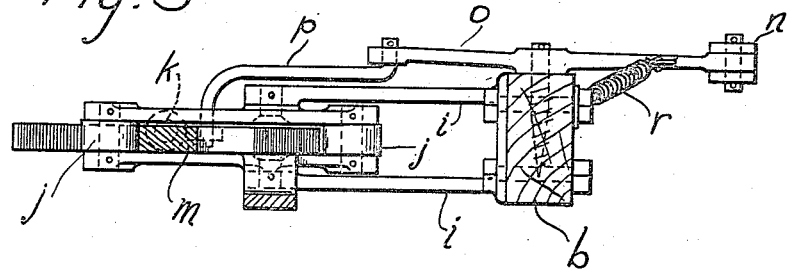
Fig. 3 is a side elevation of these same elements.

The draw pole $b$ carries at one side a pair of bracket arms $i$ detailed in Fig. 3. The two arms will be termed "the bracket." This bracket pivotally supports a direction-of-motion-changing-device which has the dual capacity at selected times of converting the pulling or pushing force into either a pulling or pushing effort on the steering gear. Roughly, the device comprises a double or T-like bell crank lever, whose double actuating arm or head is slotted as shown in Fig. 3 by reason of being made up of two bars, one upon the other, spaced by rollers $j$. The upper and the lower bars of this two arm bell crank lever are shown in Fig. 2.

Figure 4:
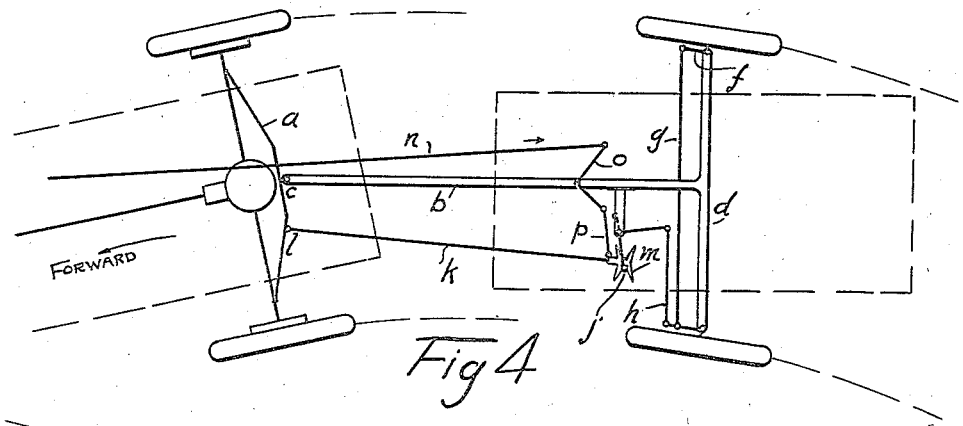
Fig. 4 is a diagrammatic view of the apparatus showing the parts in position for forward steering.

Now, this double arm bell crank lever is actuated from one end or the other end of its T-like head by a draft link $k$ having a universal connection $l$ at about a quarter point on the truss bar $a$. Whether this draft link $k$ pulls on one end or the other end of the bell crank lever depends upon whether the star-like slide $m$ is at one end or the other of the slotted T-head. Ordinarily the slide $m$ is at the side of the T-head shown in the full lines of Fig. 1. This is the position when driving forward. When the motor car and trailer are driving straightaway ahead, the draft from the motor car to the trailer is largely through the draw pole $b$ and the draft link $k$ serves only to maintain the steering gear in the center position. When, however, the motor car turns to the left, for instance, as shown in Fig. 4, this shortens up the distance at the left between the rear of the motor car and the front of the trailer, and consequently pushes the draft link $k$ backward, which serves through the double arm bell crank lever to pull on the steering gear draw link $h$, thereby causing the steering wheels of the trailer to track in turning around a corner instead of attempting to take a shorter cut. Obviously when the motor vehicle turns to the right, instead of a backward push on the draft link $k$, there will be a pull and the steering wheels of the trailer will be swung around to accomplish the same object.

Figure 5:
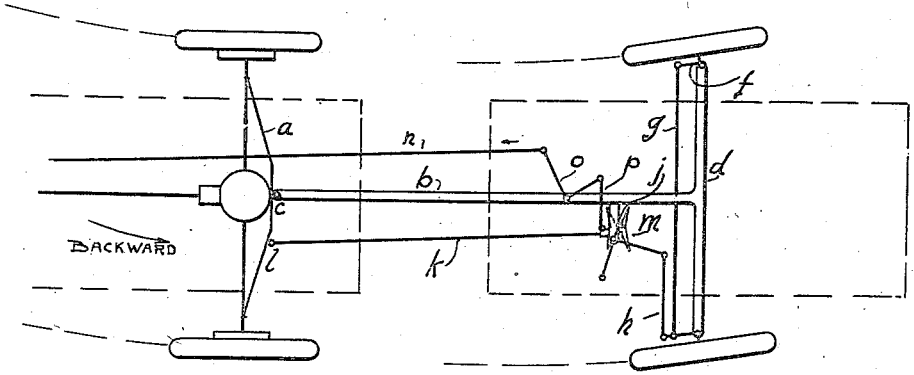
Fig. 5 is a diagrammatic view of the apparatus showing the parts in position for backing.

If the driver of the motor car desires to back, he can very nicely control the direction of the trailer by shifting lever (not shown) on the motor vehicle and convenient for reach, which pulls on the reach rod $n$. The direction of motion is changed by the bell crank lever $o$, and it, pulling through the link $p$, draws the star-like slide $m$ over to the dotted line position shown in Fig. 1. Now it is apparent that the effort of the link $k$ is communicated to the opposite arm of the double arm bell crank lever. Looking at Fig. 5, we find the operation in the backing action diagrammatically shown. The driver starts to back and at the same time turns to the right. This action immediately tends to shorten the distance on the left between the motor vehicle and the trailer, resulting in a pushing action on the link $k$, which being communicated to the short arm of the double arm bell crank lever, results in a pushing action being communicated from this double arm bell crank lever to the steering gear draw link $h$, thereby turning the wheels of the trailer to the right as shown in Fig. 5. Obviously if this shifting action from one side to the other of the double arm bell crank lever is not had, the bell crank lever would pull on the steering gear draw link $h$ instead of pushing on it and the wheels of the trailer would be turned in just the opposite direction desired.

When the driver is through backing, the lever (not shown) that he has operated is released and the spring $r$ returns the slide $m$ to the normal position for driving forward.

In the backing of the vehicle, quite a sharp turn of the steering wheel is necessary to make the desired divergence of the rear wheels from a straight path backward. Hence it will be noted that the length of the "backing" arm of the two arm bell crank lever is shorter than the "ahead" arm of the bell crank lever, thereby securing a larger swing of the steering wheels for the same amount of effort exercised by the link $k$. It will also be noted that the roller at the backing end of the double arm bell crank lever is larger in diameter than the roller at the "ahead" end of the double arm bell crank lever. There is practically no clearance between the larger roller and the notch in the star-like slide $m$, while there is a small clearance between the smaller roller and its notch in the star-like slide $m$. The purpose of this is to allow a very slight movement of the draw link due to the jarring of the axle of the automobile without communicating this motion to the steering gear of the trailer.

The rods $s$ extending from the end of the truss $a$ to about a middle portion of the draw pole $b$, limit the possible angular relation between the trailer and the preceding vehicle. The rods $t$, $t$, serve as braces for the draw pole upon the front axle of the trailer.

What I claim is:

1. Steering apparatus for trailers, having in combination, a draw pole, a double arm bell crank lever supported thereon and having its actuating end for connection with the steering wheels of the trailer, a slide for shifting to one end or the other of the actuated end of the double arm bell crank lever, and a link attached to the slide and whose forward end can be attached to the preceding vehicle at one side.

2. Steering apparatus for a trailer, having in combination, a draw pole, a bracket thereon, a slotted T-lever pivoted to the bracket, a slide engaging in said slot and slidable from one end of the T-head to the other, the stem of the T-head being used in connection with the steering wheels of the trailer, a draw link attached to said slide and for attachment to the rear of the preceding vehicle at one side, and means by which the slide may be shifted at one side or the other of the T-lever for the backing and forwarding operation of the trailer.

3. Apparatus for steering a trailer, having in combination, a draw pole, a bracket attached thereto, a T-lever having a slotted head portion, a star-like slide therein, a draw link attached to the slide and for attachment to one side of the preceding vehicle, and a line of links and levers for sliding the slide and for connection to a point convenient for the driver of the preceding vehicle.

4. Steering apparatus for a trailer, having in combination, a draw pole, a draft and push rod for attachment to a preceding vehicle, steering gear operating the steering wheels of the trailer, reversible transmission devices for transmitting the effort of the draft and push rod to the steering gear, and means for optionally setting the reversible transmission so that the push and pull effort of the draft and push rod is reversed when communicated to the steering gear.

5. Steering apparatus for a trailer, having in combination, a draw pole, a draft and push rod for attachment to a preceding vehicle, steering gear operating the steering wheels of the trailer, a lever for operating the steering gear pivotally supported, and connecting devices between said lever and the draft and push rod shiftable from one side to the other of the pivoting of the lever for the purpose set forth.

In testimony whereof, I sign this specification.

LAWRENCE N. SPENCER.